April 28, 1925.  1,535,935
A. E. McLEAN ET AL
ROTARY JAR
Filed Dec. 13, 1923  2 Sheets-Sheet 1
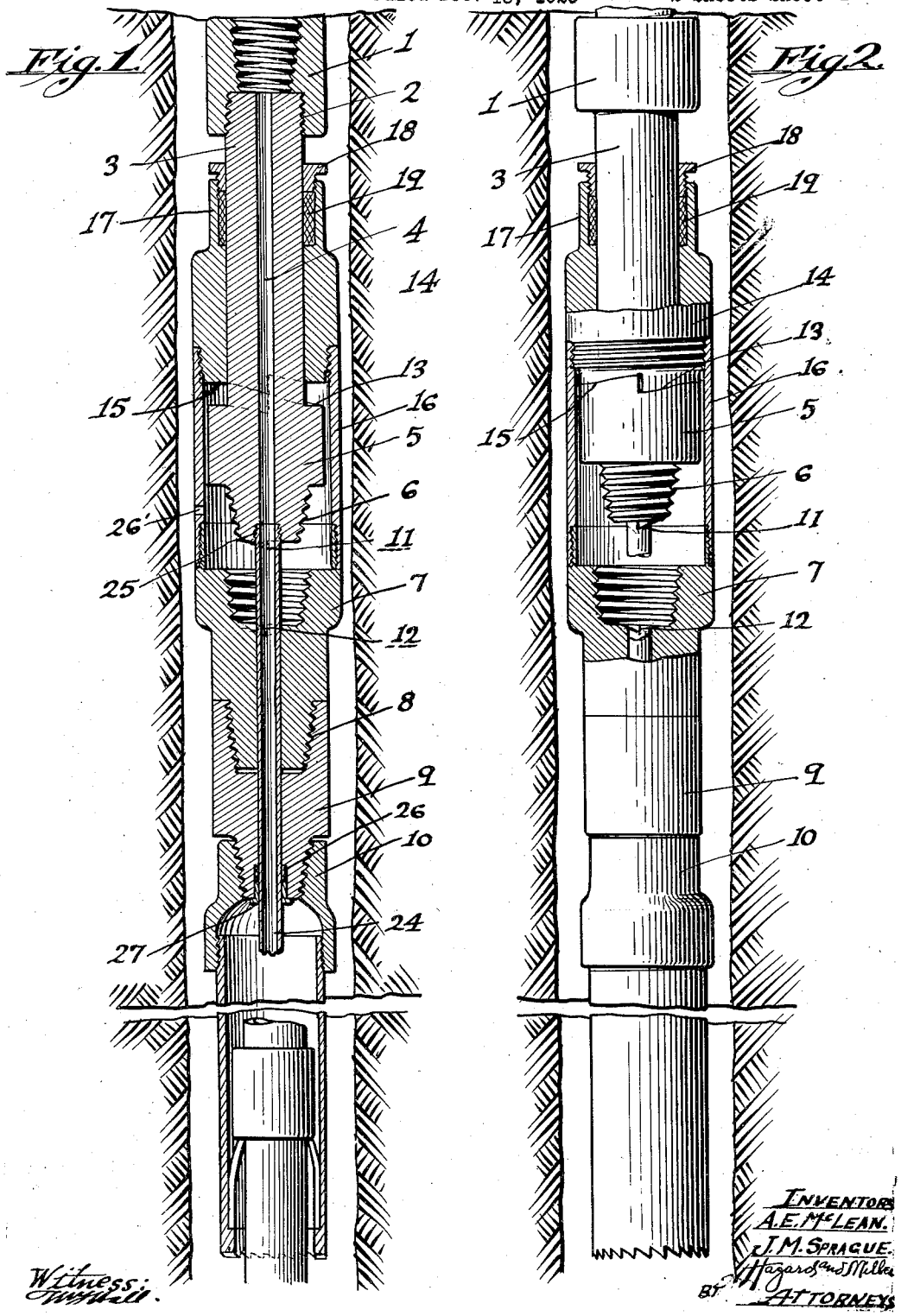

April 28, 1925.
A. E. McLEAN ET AL
1,535,935
ROTARY JAR
Filed Dec. 13, 1923   2 Sheets-Sheet 2
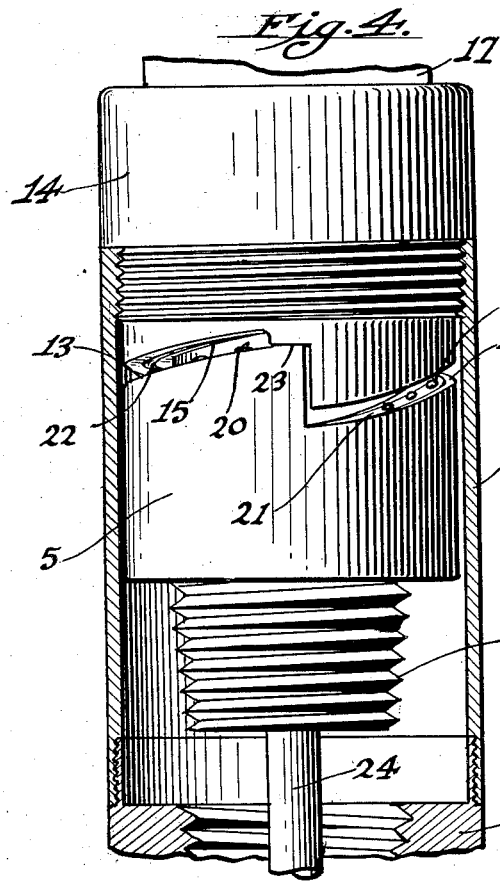
Fig.4.
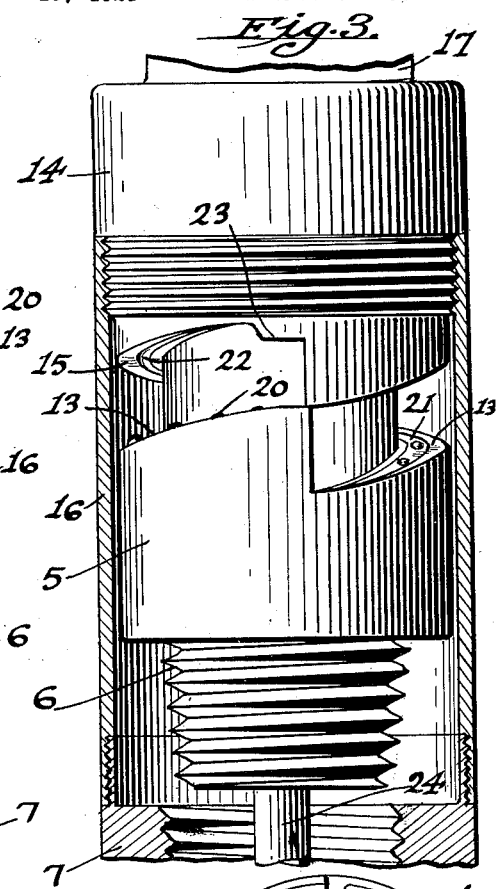
Fig.3.
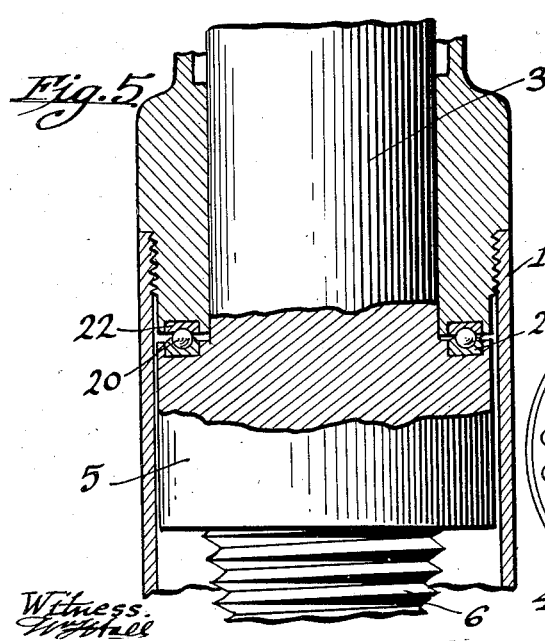
Fig.5.
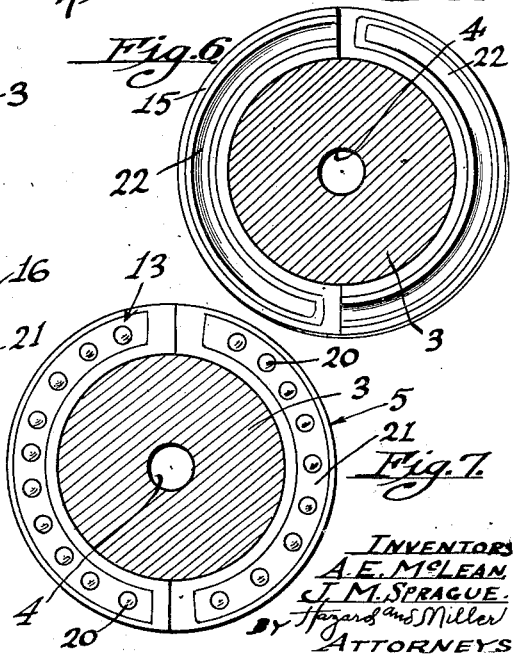
Fig.6.
Fig.7.
INVENTORS
A.E. McLEAN
J.M. SPRAGUE
BY Hazard and Miller
ATTORNEYS Patented Apr. 28, 1925.

1,535,935

UNITED STATES PATENT OFFICE.

ANTHONY E. McLEAN AND JOHN M. SPRAGUE, OF FULLERTON, CALIFORNIA.

ROTARY JAR.

Application filed December 13, 1923. Serial No. 680,443.

*To all whom it may concern:*

Be it known that we, ANTHONY E. McLEAN and JOHN M. SPRAGUE, citizens of the United States, residing at Fullerton, in the county of Orange and State of California, have invented new and useful Improvements in Rotary Jars, of which the following is a specification.

Our present invention being referred to as a rotary jar it may be understood to be an object of this invention to provide means, adapted to be connected with an overshot, or other "fishing" tool, to withdraw a "fish" from an oil or other well.

It is an object of this invention to provide comparatively simple and rugged means for imparting to a fishing tool either a rotary motion, suitable for effecting an engagement with a fish, and subsequently imparting a series of sudden vertical impulses or jars, suitable to loosen and lift a section of pipe or other fish from a well, in which the same may have become lodged.

It is a further object of our invention to provide a rotary jar comprising an upper box rigidly connected with a shaft carrying a head which may serve alternately either as means for engaging a lower box or as a hammer, the mentioned shaft being surrounded by a shell rigidly connected at its lower end with said lower box and rigidly connected at its upper end with an element serving as an anvil, to receive the jars or impulses imparted by means of the mentioned hammer; and, in a preferred embodiment of our invention, both the mentioned shaft and the lower box may be provided with a circulation passage.

It is a further object of our invention to provide a rotary jar with cam means for producing the reciprocation of a hammer element relatively to an anvil element, the latter being preferably provided with a blow-receiving prominence; and, in a preferred embodiment of our invention, this mentioned prominence may be utilized to protect bearings with which one of a pair of co-operating cam surfaces may optionally be provided.

It is an object of our invention to provide a rotary jar with circulation means comprising a tube secured to a hammer element and extending through a lower box, this lower box being optionally provided with a "sub" having threaded engagement therewith, and provided in turn with threaded means for the engagement of an overshot or other fishing tool.

It is a further object of our invention to provide a rotary jar comprising a hammer element adapted alternately to impart rotation to a lower box with means preventing the locking of said hammer element within said lower box; and a preferred embodiment of our invention may be so constructed as to permit of a suitable lubrication of the mentioned hammer element and of its threaded connection with the lower box, without interfering with the continuous circulation of slush downward throughout the entire organization referred to, suitable packing being preferably provided to permit of either a rotary or reciprocating movement of the shaft carrying the mentioned hammer element and a circulation tube connected therewith respectively through a sleeve which may be integral with an anvil element and through the mentioned lower box, or the "sub" connected therewith.

Other objects of our invention will appear from the following description of one advantageous embodiment thereof, and from the appended claims, taken in connection with the accompanying drawings, in which Fig. 1 is a vertical section through a rotary jar embodying our invention and showing the same as connected with an overshot fishing tool, which has engaged the upper end of a fish, the parts being shown as occupying the relative positions normal to them, after a fish has been engaged and at the moment when a jar is about to be imparted thereto.

Fig. 2 is a view of the same parts, showing their relative positions immediately after a vertical jar has been imparted, the parts being shown in section or broken away.

Fig. 3 is a somewhat enlarged sectional elevation of the hammer and anvil elements of our invention, showing an embodiment of same in which ball bearings are employed, parts being shown in the relative position occupied immediately before an upward jar action is imparted.

Fig. 4 is a similar view of the same parts immediately after the jarring action is imparted.

Fig. 5 is a view corresponding to Fig. 4, but showing parts cut away to a central plane.

Figs. 6 and 7 are transverse sectional views showing respectively upper and lower co-operating cam surfaces provided with ball bearings of a type disclosed in Figs. 3, 4 and 5.

Referring to the details of that specific embodiment of our invention chosen for purposes of illustration, 1 may be an upper box rigidly connected, as by means of the female threads 2, with a shaft 3, shown as provided with a central circulation passage 4, and as terminating in a head 5. The lower portion of this head may be provided at 6 with a relatively coarse and steep male thread, adapted to engage a lower box 7, which may in turn be provided at its lower end with a similar male thread 8, adapted to engage either an intermediate "sub" 9, or an overshot or other fishing tool 10 of any preferred type, it being obvious that the parts referred to are so related that when suitable rotation is imparted to the shaft 3, as by means of a string of pipe (not shown) connected with box 1, the head 5 being lowered sufficiently to permit an engagement of the male thread 6 within the box 7, the fishing tool 10 may be rotated in a manner suitable to the engagement thereof with a fish; and in order to permit of a ready disengagement of the head 5, after a fish shall have been caught, we consider it advantageous to terminate the thread 6, upon head 5, with an abrupt shoulder 11, adapted to contact with an opposite and co-operating shoulder 12, terminating the female thread in the lower box 7.

In order to impart an effective upward jarring movement to a fish, after the same has been engaged by the means described, and after the head 5 is backed off sufficiently to permit a free rotation thereof independently of the lower box 7, we may employ any suitable means, our preferred means for the purpose last referred to comprising a pair of cam surfaces, one of which may be the upper surface 13 of the head 5, adapting the same to serve as a hammer. To receive the intermittent upward blow of the head or hammer 5, we may optionally provide an anvil element 14, shown as provided with a co-operating cam surface 15, and as rigidly connected with the lower box 7 by means of a shell 16, which may confine a lubricating grease or other material, the upper portion of the anvil 14 being preferably in the form of a sleeve 17, surrounding the shaft 3, and shown as provided with a gland 18, confining at 19 a suitable lubricating packing.

Although the co-operating cam surfaces 13, 15 may be of any preferred or suitable type, we have shown these surfaces as structurally resembling the co-operating surfaces of a clutch; but it will be understood that, an anvil element being normally held against rotation by the engagement of a fish and suitable rotation being imparted to the head or hammer 5, after its elevation out of contact with the lower box 7, and a continuous upward tension being maintained upon the shaft 3 during the rotation thereof, the advance of the cam surface 13 relatively to the co-operating surface 15 of the anvil 14 can only be effective to separate the hammer 5 from the anvil 14, thereafter permitting, whenever the hammer moves from the relative position shown in Fig. 3 to the relative position shown in Fig. 4, a sudden and powerful upward jarring stroke upon the said anvil. It is the tendency of this stroke, completed every half revolution by an organization such as is disclosed for purposes of illustration, to loosen and lift a fish from its place of lodgment, facilitating the complete withdrawal of the same.

In order to facilitate the relative rotation of the co-operating cam surfaces described, or their equivalent, we may optionally provide the same with ball, or other, bearings,— one simple type of bearing for the purpose referred to being illustrated in Figs. 2, 3 and 7 inclusive, in which the balls 20 are shown as spaced apart within a substantially semi-circular steel bearing plate 21, set in the upper surface of the cam face 13. Plate 21 may be shaped to retain the said balls, steel channel 22 being secured in the opposed cam surface 15, a shock-receiving prominence 23 being preferably provided upon either the anvil 5 or the anvil 14 of such character and so positioned as to protect the bearings referred to, or their equivalent, from the direct shock of an impact therebetween.

In order to permit of the continuous circulation of slush through a rotary jar of the character described, without interfering with the lubrication of the parts referred to, we may provide a central circulation aperture not only through the shaft 3, but also through the lower box 7, and through the "sub" 9 when such is employed, the primary function of the "sub" 9 being protection of a pipe 24, shown as threaded, at 25, into the lower end of head or hammer 5, this tube being employed to prevent entrance of slush into the chamber defined by the shell 16, within which the head or hammer 5 may rotate or reciprocate, packing 26 being preferably retained as by means of a gland 27 in order to secure a tight joint near the lower or exit end of said pipe, while permitting of either rotative or jarring movement between the parts referred to.

Although we have herein described one complete embodiment of our invention, it will be understood that the proposed use of ball bearings, or the like, is optional and may be ordinarily found unnecessary, and also that various features of our invention may be independently employed and that various modifications may be made therein, without involving a departure from the spirit and scope of our invention, as the same is indicated above and in the following claims. For example, although it may be advantageous to provide for the lubrication of the co-operating cam surfaces 13 and 15, we may find it advantageous, especially when working at considerable depths, to provide a lateral opening 26', through the shell 16, or elsewhere, in order to permit an equalization of pressure and a movement of fluid therethrough, as any vertical movement of the shaft 4, or its equivalent, must obviously tend to a corresponding displacement of fluid within the chamber defined by said shell. The action of gravity being sufficient to assure the retention of lubricant in the upper portion of the chamber referred to, a movement of air or water or "slush" inward and outward through the hole 26, or its equivalent, need have no detrimental effect, the character and relationship of the threads upon the head 5 and within the lower box 7 being preferably such as to require no lubrication.

What we claim is:

1. In a rotary jar, an upper box rigidly connected with a shaft provided at its lower end with a head provided with means to engage a lower box, said head and said lower box being provided with co-operating threads terminating in shoulders.

2. In a rotary jar, an upper box rigidly connected with a shaft provided at its lower end with a head provided with means to engage a lower box having a cam face, said head being adapted to serve alternately as an anvil provided with a cam face to engage the first cam face.

3. In a rotary jar, an upper box rigidly connected with a shaft provided at its lower end with a head provided with means to engage a lower box having a cam face, said head being adapted to serve alternately as an anvil provided with a cam face and with bearings to engage the first cam face.

4. In a rotary jar, an upper box rigidly connected with a shaft provided at its lower end with a head provided with means to engage a lower box rigidly connected with a shell through which said shaft extends, said shell being also rigidly connected with an anvil provided with a cam face adapted to engage a corresponding cam face upon said head.

5. In a rotary jar, an upper box rigidly connected with a shaft provided at its lower end with a head provided with means to engage a lower box rigidly connected with a shell through which said shaft extends, said shell being also rigidly connected with an anvil provided with a cam face adapted to engage a corresponding cam face upon said head, one of said cam faces being provided with a shock-receiving prominence.

6. In a rotary jar, an upper box rigidly connected with a shaft provided at its lower end with a head provided with means to engage a lower box rigidly connected with a shell through which said shaft extends, said shell being also rigidly connected with an anvil provided with a cam face adapted to engage a corresponding cam face upon said head, one of said cam faces being provided with a shock-receiving prominence and the other of said cam faces being provided with bearings protected thereby.

7. In a rotary jar, a shaft rigidly connected with an upper box and extending through a shell connected with a lower box, said shell being rigidly connected with an anvil and said shaft being rigidly connected with a hammer, provided with means for alternative use in rotating said lower box and a fishing tool connected therewith.

8. In rotary jar, a rotatable and vertically movable shaft provided with a head, a lower box connected with a fishing tool, and means for imparting, by the rotation of said shaft, either a rotary or vertical jar movement to said lower box.

9. In a rotary jar, a rotatable and vertically movable shaft provided with a head, a lower box connected with a fishing tool, and means for imparting, by the rotation of said shaft, either a rotary or vertical jar movement to said lower box by means comprising a thread and a cam on said head.

10. In a rotary jar, a rotatable and vertically movable shaft provided with a head, a lower box connected with a fishing tool, and means for imparting, by the rotation of said shaft, either a rotary or vertical jar movement to said lower box by means comprising a thread and a cam on said head, said thread being terminated by a shoulder adapted to co-operate with a corresponding shoulder with which said box is provided.

11. In a rotary jar, a rotatable and vertically movable shaft provided with a head, a lower box connected with a fishing tool, and means for imparting, by the rotation of said shaft, either a rotary or vertical jar movement to said lower box by means comprising a thread and a cam on said head, said cam being adapted to co-operate with a corresponding cam upon an anvil secured to said box by means of a shell within which said head may reciprocate or rotate.

12. In a rotary jar, a shaft carrying a head provided with a thread adapted to engage a box to rotate the same and with a cam surface adapted to engage an anvil to jar the same.

13. In a rotary jar a shaft, a lower box, and means for imparting to said lower box by means of said shaft either a rotative movement or an upward jar.

14. In a rotary jar, an upper box rigidly connected with a shaft and provided at its lower end with a head, a threaded extension formed on the lower end of said head adapted to engage a lower box, an anvil element connected to said lower box and disposed above said head, and cam surfaces formed upon said head and said anvil element adapted to engage each other and to impart bearing movement to said lower box upon rotation of said head.

15. In a rotary jar, an upper box rigidly connected with a shaft and provided at its lower end with a head, a threaded extension formed on the lower end of said head adapted to engage a lower box, an anvil element connected to said lower box and disposed above said head, and cam surfaces formed upon said head and said anvil element adapted to engage each other and to impart bearing movement to said lower box upon rotation of said head, said cam surfaces being provided with shock receiving prominences.

16. In a rotary jar, an upper box rigidly connected with a shaft and provided at its lower end with a head, a threaded extension formed on the lower end of said head adapted to engage a lower box, an anvil element connected to said lower box and disposed above said head, and cam surfaces formed upon said head and said anvil element adapted to engage each other and to impart bearing movement to said lower box upon rotation of said head, the cam surfaces of said head being provided with bearing plates retaining bearings engageable by the cam surfaces of said anvil element.

In testimony whereof we have signed our names to this specification.

ANTHONY E. McLEAN.
JOHN M. SPRAGUE.